( 12 ) United States Patent
Peng (10) Patent No.: US 10,819,574 B2
(45) Date of Patent: Oct. 27, 2020

(54) LOW OR ZERO TOUCH PROVISIONING SYSTEMS AND METHODS OF NETWORK ELEMENTS OVER UNNUMBERED INTERFACES

(71) Applicant: Ciena Corporation, Hanover, MD (US)

(72) Inventor: Cheng Peng, Nepean (CA)

(73) Assignee: Ciena Corporation, Hanover, MD (US)

( * ) Notice: Subject to any disclaimer, the term of this patent is extended or adjusted under 35 U.S.C. 154(b) by 260 days.

(21) Appl. No.: 15/478,494

(22) Filed: Apr. 4, 2017

(65) Prior Publication Data

US 2018/0287873 A1 Oct. 4, 2018

(51) Int. Cl.
G06F 15/177 (2006.01)
H04L 12/24 (2006.01)
H04L 29/12 (2006.01)

(52) U.S. Cl.
CPC ...... H04L 41/0886 (2013.01); H04L 41/0806 (2013.01); H04L 61/2015 (2013.01)

(58) Field of Classification Search
None
See application file for complete search history.

(56) References Cited

U.S. PATENT DOCUMENTS

| | | | | |
|---|---|---|---|---|
| 6,697,360 B1 * | 2/2004 | Gai | ..................... | H04L 41/0886 370/389 |
| 7,420,933 B2 | 9/2008 | Booth, III et al. | | |
| 9,391,842 B2 * | 7/2016 | Abbas | ................. | H04L 41/0806 |
| 2005/0163118 A1 * | 7/2005 | Steindl | .............. | H04L 29/12254 370/389 |
| 2008/0025299 A1 * | 1/2008 | Agarwal | ............. | H04L 61/6013 370/389 |
| 2009/0201830 A1 * | 8/2009 | Angelot | .................. | H04L 12/66 370/254 |
| 2010/0287266 A1 * | 11/2010 | Asati | ................... | H04L 12/4641 709/222 |
| 2011/0040933 A1 | 2/2011 | Swindell | | |
| 2014/0122674 A1 | 5/2014 | Gray et al. | | |
| 2015/0019759 A1 * | 1/2015 | Tran | .................... | H04L 41/0886 709/245 |
| 2016/0164832 A1 | 6/2016 | Bellagamba et al. | | |
| 2016/0359805 A1 * | 12/2016 | Spraggs | .............. | H04L 41/0806 |
| 2017/0272317 A1 * | 9/2017 | Singla | ..................... | H04L 41/12 |
| 2018/0183753 A1 * | 6/2018 | Vemulakonda | ..... | H04L 41/0886 |

FOREIGN PATENT DOCUMENTS

WO 2016/159954 A1 10/2016

* cited by examiner

Primary Examiner — Phyllis A Book
(74) Attorney, Agent, or Firm — Clements Bernard Walker; Lawrence A. Baratta, Jr.; Christopher L. Bernard (57) ABSTRACT

A method of low or zero touch provisioning of a network element over an unnumbered interface includes, subsequent to booting up, communicating to a Dynamic Host Configuration Protocol (DHCP) Relay Agent from the unnumbered interface; downloading a configuration through the DHCP Relay Agent over the unnumbered interface; and configuring the network element based on the downloaded configuration. The unnumbered interface can be one of an Ethernet point-to-point interface and an Optical Service Channel (OSC) interface and an overhead channel on optical port, and wherein the unnumbered interface does not have an Internet Protocol (IP) address.

18 Claims, 7 Drawing Sheets

LOW OR ZERO TOUCH PROVISIONING SYSTEMS AND METHODS OF NETWORK ELEMENTS OVER UNNUMBERED INTERFACES

FIELD OF THE DISCLOSURE

The present disclosure generally relates to networking systems and methods. More particularly, the present disclosure relates to low or zero touch provisioning systems and methods of network elements over unnumbered interfaces.

BACKGROUND OF THE DISCLOSURE

Networks (e.g., optical, packet, etc.) are realized through physical network elements interconnected to one another. Network elements are geographically deployed such as in Central Offices (COs), data centers, huts/shelters, customer premises, etc. The conventional approach to installation and provisioning includes field technicians installing, powering up the network element, and configuring provisioning information to enable the network element to communicate on the network. Zero touch provisioning includes automatic configuration of the network element once it is powered up and able to communicate on the network such as to automatically download provisioning information. Low touch provisioning, similar to zero touch provisioning, includes automatic configuration of the network element once the network element is at a minimum configured for network communication. Advantageously, these approaches to provisioning significantly reduce turn up time and configuration errors.

In conventional zero/low touch provisioning schemes, a Dynamic Host Configuration Protocol (DHCP) client enabled on a numbered interface so that an Internet Protocol (IP) address can be assigned automatically to that interface. Once the interface has an IP address, it can automatically retrieve configuration data for automatic provisioning of the network element. Unfortunately, this approach does not apply to an unnumbered interface. As described herein, a numbered interface is one that has an IP addressed assigned to it, allowing communication of a Data Communication Network (DCN) whereas an unnumbered interface does not have an IP address. The unnumbered interface can "borrow" the IP address of another interface already configured on the network element, but this approach requires configuration. It is not feasible to assign each possible interface in a network element with an IP address as such an approach is counter to conserving network and address space. The typical approach is a single IP address per network element.

Thus, there exists a need to provide systems and methods to provide device-specific configuration information via unnumbered interfaces in a network element.

BRIEF SUMMARY OF THE DISCLOSURE

In an exemplary embodiment, a method of low or zero touch provisioning of a network element over an unnumbered interface includes, subsequent to booting up, communicating to a Dynamic Host Configuration Protocol (DHCP) Relay Agent from the unnumbered interface; obtaining a configuration through the options of DHCP packets over the unnumbered interface; and configuring the network element based on the obtained configuration. The unnumbered interface can be one of Ethernet point-to-point interfaces, Optical Service Channels (OSCs), overhead channels on optical ports, and wherein the unnumbered interface does not have an Internet Protocol (IP) address. The DHCP Relay Agent can be a Layer 3 DHCP Agent, and wherein the DHCP Relay Agent can be executed on the network element for communication to a DHCP server and a file server. The obtaining can include decoding configuration commands from option 43, or option 125 or options among 224-254 of DHCP packets. The unnumbered interface ignores an Internet Protocol (IP) address, netmask, default route, and static route in responses from the DHCP Relay Agent. A server can be configured to provide the configuration through the DHCP Relay Agent and over the unnumbered interface via the DHCP packets.

In another exemplary embodiment, a network element configured for supporting low or zero touch provisioning over an unnumbered interface includes a plurality of modules interconnected to one another; an unnumbered interface communicating to a second unnumbered interface on a second network element; and a Dynamic Host Configuration Protocol (DHCP) Relay Agent operating on one of the plurality of modules, wherein the DHCP Relay Agent is configured to communicate with a server subsequent to booting up and responsive to a request from the unnumbered interface, and download a configuration from the server to the second unnumbered interface, wherein the second network element is commissioned based on the downloaded configuration over the second unnumbered interface. The unnumbered interface can be one of an Ethernet point-to-point interface and an Optical Service Channel (OSC) interface and an overhead channel on optical port, and wherein the unnumbered interface does not have an Internet Protocol (IP) address. The DHCP Relay Agent can be a Layer 3 DHCP Agent. The DHCP Relay Agent can be configured to communicate to a DHCP server; and utilize DHCP option 66, 67 information to download the configuration. The DHCP Relay Agent can perform an option conversion utilizing option 43, or option 125 or options 224-254 to allow the unnumbered interface to obtain the configuration via DHCP packets. The server can uniquely identify the network element based on one of a client identifier and an identification of the DHCP Relay Agent.

In a further exemplary embodiment, a Dynamic Host Configuration Protocol (DHCP) Relay Agent operating on a network element for low or zero touch provisioning over an unnumbered interface includes one or more processors; and memory storing instructions that, when executed, cause the one or more processors to communicate with the unnumbered interface subsequent to booting up, download a configuration from a server, and provide the configuration over the unnumbered interface using DHCP. The unnumbered interface can be one of an Ethernet point-to-point interface and an Optical Service Channel (OSC) interface and an overhead channel on optical port, and wherein the unnumbered interface does not have an Internet Protocol (IP) address. The DHCP Relay Agent can be a Layer 3 DHCP Agent. The DHCP Relay Agent can utilize DHCP option 66, 67 information to download the configuration. The DHCP Relay Agent can perform an option conversion utilizing option 43, or option 125 or options 224-254 to allow the unnumbered interface to obtain the configuration file via DHCP packets. The server can uniquely identify the network element based on one of a client identifier and an identification of the DHCP Relay Agent.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 3 is a network diagram of a network with network elements connected to a Data Communication Network (DCN) for provisioning information and the like;

DETAILED DESCRIPTION OF THE DISCLOSURE

Again, in various exemplary embodiments, the present disclosure relates to low or zero touch provisioning systems and methods of network elements over unnumbered interfaces. This is particularly applicable to network elements which are turned up with unnumbered interfaces, e.g., Optical Service Channels (OSCs), overhead channels on optical ports, Ethernet point-to-point interfaces to shelf controllers or processors, etc. The low or zero touch provisioning systems and methods use a DHCP relay agent on a network element as a delegator of a DHCP client to obtain configuration, package it into the DHCP packets and forward it to the client. The approach is able to deliver the device-specific configuration over the unnumbered point-to-point interface or link.

One-Touch Provisioning

One-touch provisioning provides turn-up automation by removing the manual device (initial) configuration work content from the field technicians. The removal of device (initial) configuration work, along with other controller/Data Collection, Analytics and Event (DCAE) automation, will, in turn, remove the need for craft interfaces and software applications. This, in theory, simplifies the field operations in supporting a dynamic mix of multiple-vendor deployment environment by focusing on physical cabling and equipment slotting aspect of the network while relying on the controller and northbound applications to perform the rest of Fault, Configuration, Accounting, Performance, Security (FCAPS) functions. Advantageously, one-touch provisioning has no initial "touch" in the field; field operations focus on physical cabling and equipment slotting aspect of the network, configuration work does not rely on craft interfaces but on the controller and northbound applications, etc. The "touch" happens when a controller correlates a network element to its configuration through the unique identifier of the network element.

Zero-Touch Provisioning

Figure 1:
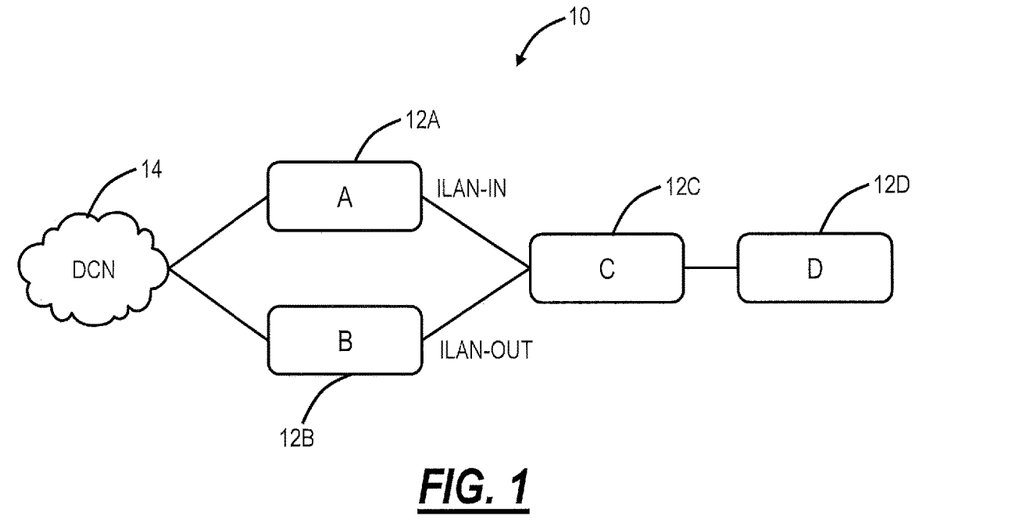
FIG. 1 is a network diagram of a network with network elements (NE)

Unlike one-touch turn-up where the controller needs to correlate the physical NE to the provision data, zero touch turn-up requires software smart enough to make such a correlation automatically. The network element cannot be identified by a unique ID since it is not known in advance by the northbound applications. Instead, the provisioning data is determined by the location/connectivity of the network element, i.e. topology information. The identity of the network element can be described by the identity of its neighboring network element and the port connecting to it. FIG. 1 is a network diagram of a network 10 with network elements (NE) 12 (labeled as NEs 12A, 12B, 12C, 12D). For example, the identity of the NE 12C can be described as a 6500 S-series SP2 shelf which the NE 12A connects to via an Inter-shelf Local Area Network (ILAN)-IN. ILAN is essentially an Ethernet port between the network elements 12. It also can be described as a 6500 S-series SP2 shelf which the NE 12B connects to via ILAN-OUT. Both descriptions are valid. The NEs 12 can connect to a Data Communication Network (DCN) 14. The configuration is validated on the receiving NE 12.

NE Provisioning

Figure 2:
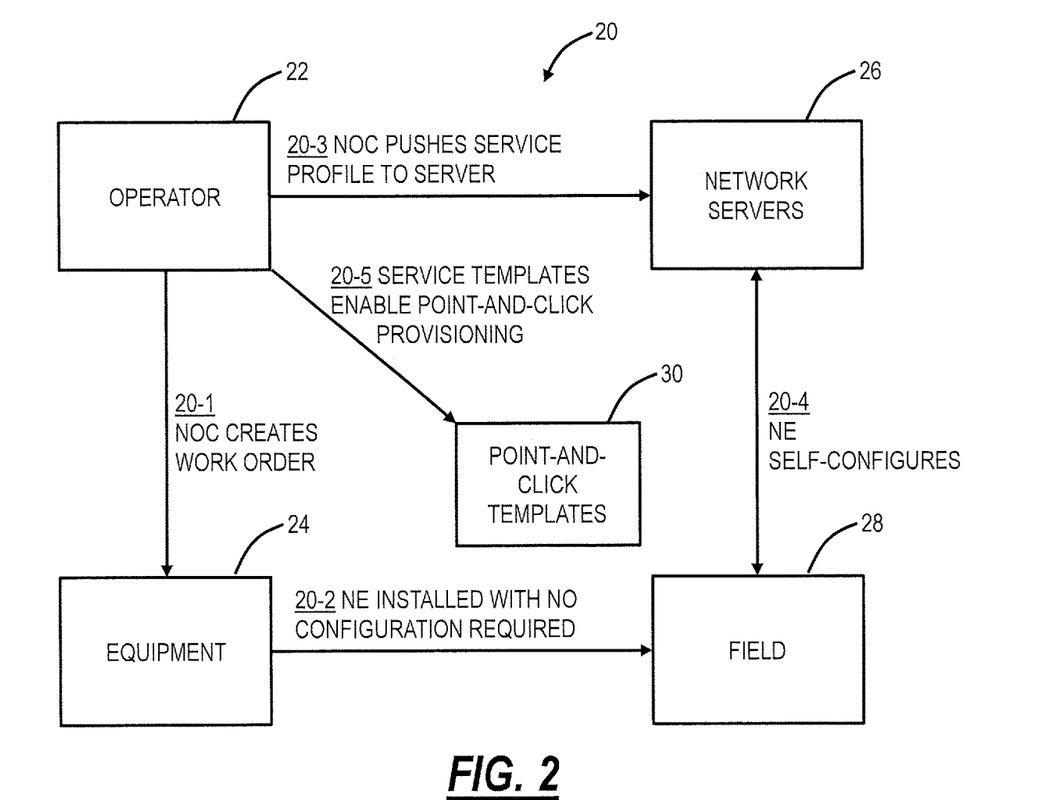
FIG. 2 is a flow diagram of a commissioning process between an operator, an equipment depot, network servers, and a field location.

FIG. 2 is a flow diagram of a commissioning process 20 between an operator 22, an equipment depot 24, network servers 26, and a field location 28. The operator 22 can include engineering, planning, a Network Operations Center (NOC), etc., i.e., personnel associated with a service provider responsible for operating and planning the network. The equipment depot 24 can be a warehouse, a vendor, etc., i.e., a location where network element equipment is located, manufactured, stored, etc. The network servers 26 communicate on the DCN 14 and can include provisioning data for the network elements. Finally, the field location 28 can be a Central Office (CO), Data Center, customer premises, cabinet, shelter, hut, etc., i.e., any location where network elements are deployed in the network.

The commissioning process 20 initiates when the operator 22 creates a work order (step 20-1), i.e., a request for a new network element. The work order is provided to the equipment depot 24 which provides the network element to the field location 28 where the network element is installed with no configuration required (step 20-2). The process of installing the network element at the field location 28 includes physical installation, i.e., installing a shelf in a rack, installing modules or line cards in the shelf, etc., and cabling, i.e., cabling optical and/or electrical interfaces, power, telemetry, etc. Once physically installed and cabled, the network element is turned up, i.e., powered on. It is at this point of physically powering on the network element where low-touch or zero-touch provisioning occurs. The operator 22 provides a service profile, i.e., configuration or provisioning data, to the network servers 26 over the DCN 14 (step 26). Once the network element is powered up at the field location 28, the network element self-configures such as contacting a DHCP server on the DCN 14 for an IP address and downloading the configuration or provisioning data from the network servers (step 20-4). A northbound application such as from the network servers 26 can push additional configurations via the network element's permanent address. Finally, the network element supports point-and-click provisioning via service templates 30 (step 20-5).

Network Deployment

Figure 3:
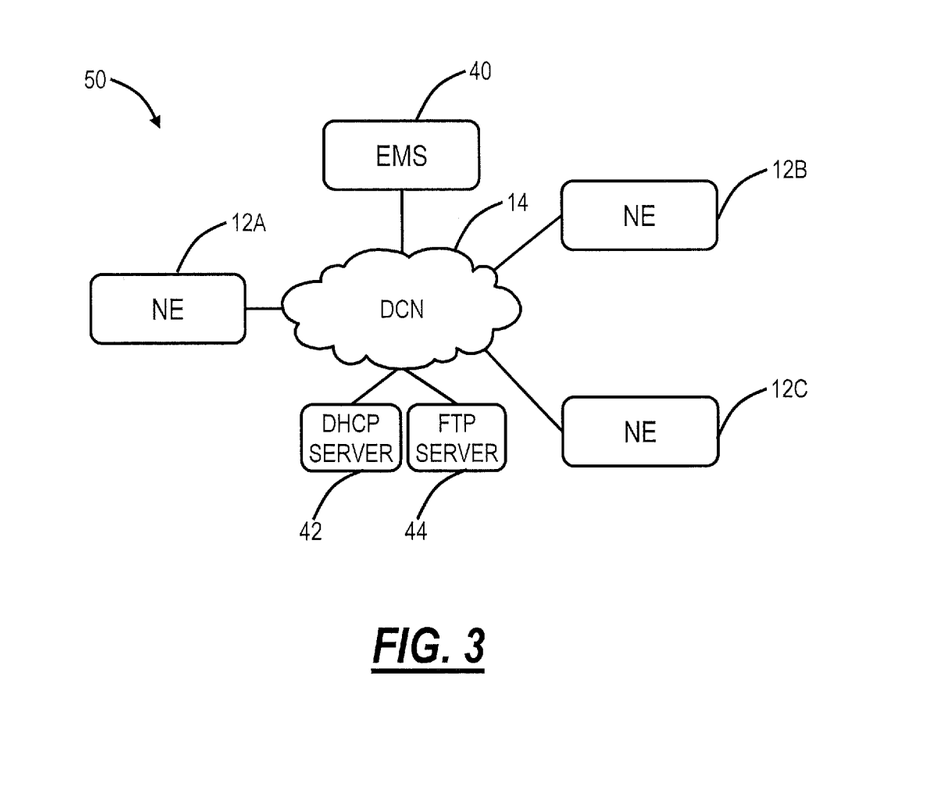

FIG. 3 is a network diagram of a network 50 with network elements 12 connected to the DCN 14 for provisioning information and the like. FIG. 3 includes three network elements 12A, 12B, 12C communicatively coupled to an Element Management System (EMS) 40 via the DCN 14. The network elements 12A, 12B, 12C can include an Add/Drop Multiplexer (ADM), a Multi-Service Provisioning Platform (MSPP), a Digital Cross-Connect (DCS), an optical cross-connect, a Packet-Optical Transport System (POTS), an optical switch, a router, a switch, a WDM/DWDM terminal, an access/aggregation device, etc. That is, the network elements 12A, 12B, 12C can be any type of node which realizes some functionality in the network 50 and which requires on-site provisioning and configuration. The network elements 12 support Low Touch Provisioning (LTP) or Zero Touch Provisioning (ZTP) over the DCN 14.

FIG. 3 illustrates a configuration where the DHCP/FTP servers 42, 44 are located in a Layer 3 network. This configuration reduces the EMS management complexity, relative to having the DHCP/FTP servers 42, 44 in the Layer 2 network such as on each of the network elements 12A, 12B, 12C. All configuration files are stored in one or a few centralized DHCP/FTP servers 42, 44. The DHCP/FTP servers 42, 44 can be located in the DCN 44 or the network elements 12. Redundancy of the DHCP/FTP servers 42, 44 is achieved by introducing another server and the number of the DHCP/FTP servers 42, 44 is not proportional to the number of network elements 12. However, this configuration requires IP reachability and the IP addresses assigned by the DHCP server 42 must be routable.

LTP/ZTP Over Unnumbered Interfaces

Figure 4:
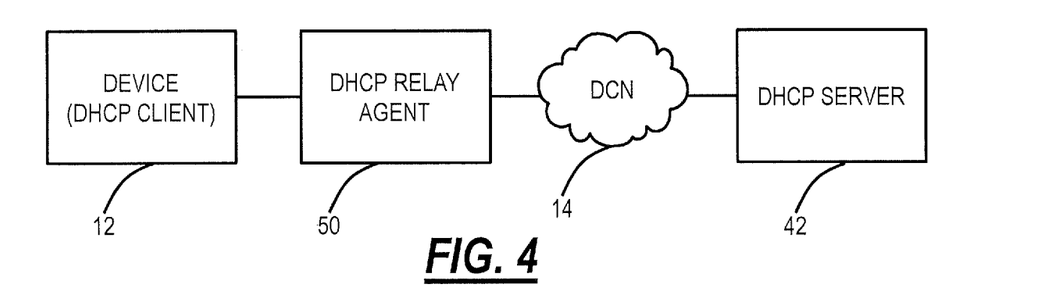
FIG. 4 is a network diagram of a Dynamic Host Configuration Protocol (DHCP) Relay Agent between the network element and the DHCP server over the DCN.

In various exemplary embodiments, the systems and methods support LTP/ZTP in the configuration of FIG. 3 where the network elements 12 have unnumbered interfaces to the DHCP/FTP servers 42, 44. Again, LTP/ZTP allows the network elements 12 to be provisioned and configured automatically. The network elements 12 send out a request through DHCP to the DHCP server 42 to obtain the location of its configuration. It then downloads and installs it. In the case that the network element 12 is not in the same Layer 2 network with the DHCP server 42, DHCP relay agents are employed as a mediator to forward DHCP packets between clients and servers. FIG. 4 is a network diagram of a DHCP Relay Agent 50 between the network element 12 and the DHCP server 42 over the DCN 14. The network element 12 is determined by the identity of the DHCP Relay Agent 50 as well as the local port connecting to the network element 12. The DHCP Relay Agent 50 can report that information via option 82 along with the DHCP packets sent by the network element 12 to the DHCP server 42 so that the DHCP server 42 can reply the specific configuration to the network element 12 in terms of the information.

The approach works perfectly if the DHCP client (the network element 12) runs over a numbered interface on the network element 12 because a routable IP address is assigned to the interface so the network element 12 can access to the configuration. However, the technique does not work if the DHCP client runs over an unnumbered interface because 1) the interface does not have its own IP address and 2) the network element 12 is not reachable unless a routing protocol is configured. The routing protocol information cannot be conveyed by the DHCP protocol. Consequently, the network element 12 is not able to reach the configuration, causing the ZTP/LTP failing.

As described herein, the network element 12 includes various interfaces to connect the DCN 14 including Ethernet ports, Optical Service Channels (OSC), Overhead communication channels, etc. Again, as described herein, an unnumbered interface is an interface on the network element 12 which does not have an IP address and cannot receive an IP address which is routable from the DHCP server 42.

Figure 5:
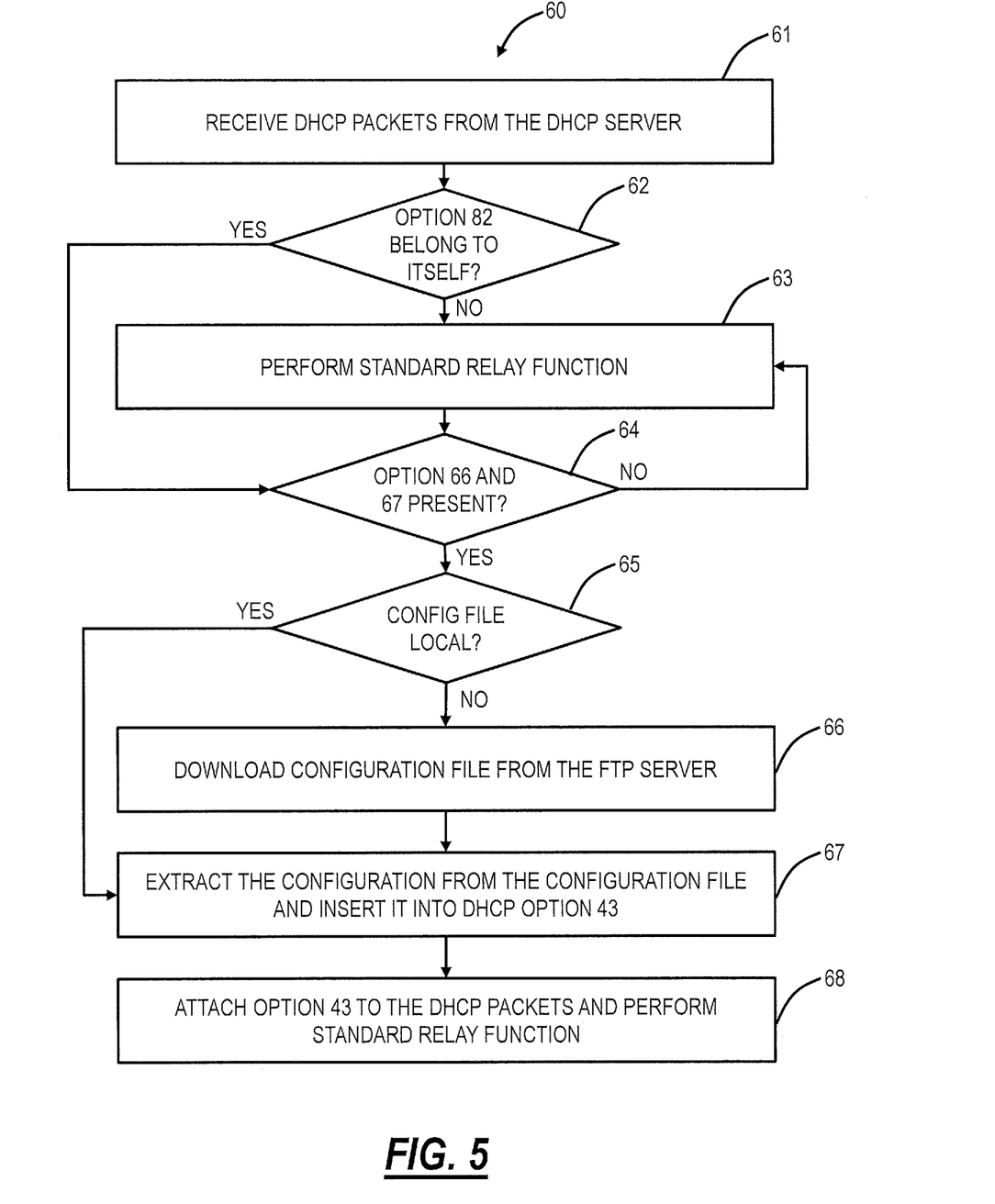
FIG. 5 is a flowchart of a DHCP Relay Agent process adapted to support configuration file distribution using DHCP packets over unnumbered interfaces.

The systems and methods deliver the device-specific configuration to each device over unnumbered interfaces, e.g., unnumbered Ethernet point-to-point interfaces, OSC interfaces, and other optical interfaces, during ZTP/LTP. The systems and methods include modifications on the DHCP Relay Agent 50. FIG. 5 illustrates a flowchart of a DHCP Relay Agent process 60 adapted to support configuration file distribution using DHCP packets over unnumbered interfaces.

The Bootstrap Protocol (BOOTP) [RFC951] describes an IP/UDP bootstrap protocol (BOOTP) which allows a diskless client machine to discover its own IP address, the address of a server host, and the name of a file to be loaded into memory and executed. The Dynamic Host Configuration Protocol (DHCP) [RFC2131] provides a framework for automatic configuration of IP hosts. The document "DHCP Options and BOOTP Vendor Information Extensions" [RFC2132] describes options for DHCP, some of which can also be used with BOOTP. Additional DHCP options are described in other RFCs. The contents of RFC951, RFC2131, and RFC2132 are incorporated by reference herein. The DHCP Relay Agent 50 can be located at the network element 12 and is any host or IP router that forwards DHCP packets between clients and servers. The DHCP Relay Agent 50 can operate as described in RFC3046, "DHCP Relay Agent Information Option," the contents of which are incorporated by reference herein.

When the DHCP Relay Agent 50 receives DHCP packets from the DHCP server 42 (step 61), the process 60 performs the following extra steps to process the packet to support LTP/ZTP over unnumbered interfaces, diverting from the behavior of a standard DHCP relay agent. The process 60 includes checking whether the DHCP packet's option 82 belongs to the DHCP Relay Agent 50 (step 62), and if not, the process 60 includes performing standard relay functions (step 63). DHCP option 82 indicates the DHCP packet includes Relay Agent information. If the DHCP packet's option 82 belongs to the DHCP Relay Agent 50 (step 62), the process 60 includes checking whether DHCP options 66 and 67 (FTP server 44 and configuration location) are present (step 64), and if not, the process 60 includes performing standard relay functions (step 63). Note, the process 60 checks in the DHCP options 66 and 67 are present to locate the FTP server 44 and the configuration location, but it is not limited to these two options. Those skilled in the art will recognize the process 60 can use any DHCP other options such as option 125, option 150, etc. to locate a configuration file. Further, while the configuration file is described in the FTP server 44, the process 60 is not limited to the FTP server 44; those skilled in the art recognize any file transfer technique is contemplated.

If the DHCP options 66 and 67 (FTP server 44 and configuration location) are present (step 64), the process 60 first check whether the configuration file has been downloaded into the local disk (step 65), and if not, the process 60 includes downloading by the DHCP Relay Agent 50 a configuration file from the FTP server 44 to the local disk (step 66). When the option 66 and 67 present, it must be determined whether the configuration file has been downloaded into the local disk before. If so, that local configuration file can be used; otherwise, the configuration file is downloaded from the FTP server 44. The local copy of the configuration file can be kept for a period of time and then can be removed.

The process 60 then includes extracting the configuration from the configuration file and inserting it into a DHCP packet with option 43 (Vendor Specific information) (step 67), and attaching option 43 to the DHCP packets and performing the standard relay function (step 68). Steps 65-67 is an option conversion which allows the network element 12 (i.e., the DHCP client) to obtain the configuration information via DHCP packets from the DHCP server 42 through option 43. The DHCP client ignores the IP address, netmask, default route (DHCP option 3) and static route (DHCP option 33) information assigned by the DHCP server 42 because they are not required by unnumbered interfaces. It then extracts the configuration from the DHCP option 43 and configures the network element 12 based thereon. Steps 64-65 are not restricted to the FTP server 44 but can be extended to anything that indicates the location of the configuration file. Of note, the process 60 can also operate with DHCP for IPv6 (DHCPv6). Though it is shown that the option 43 is employed to convey the configuration, other implementation may choose to use other options such as option 125 or options among 224-254. For DHCPv6, the option may be option 17 instead of option 43. Thus the relay agent is running on IPv6, it will insert the configuration to option 17 of DHCPv6. The options to locate the configuration file in DHCPv6 are different from DHCP.

DHCP Relay Agent on a Network Element

Figure 6:
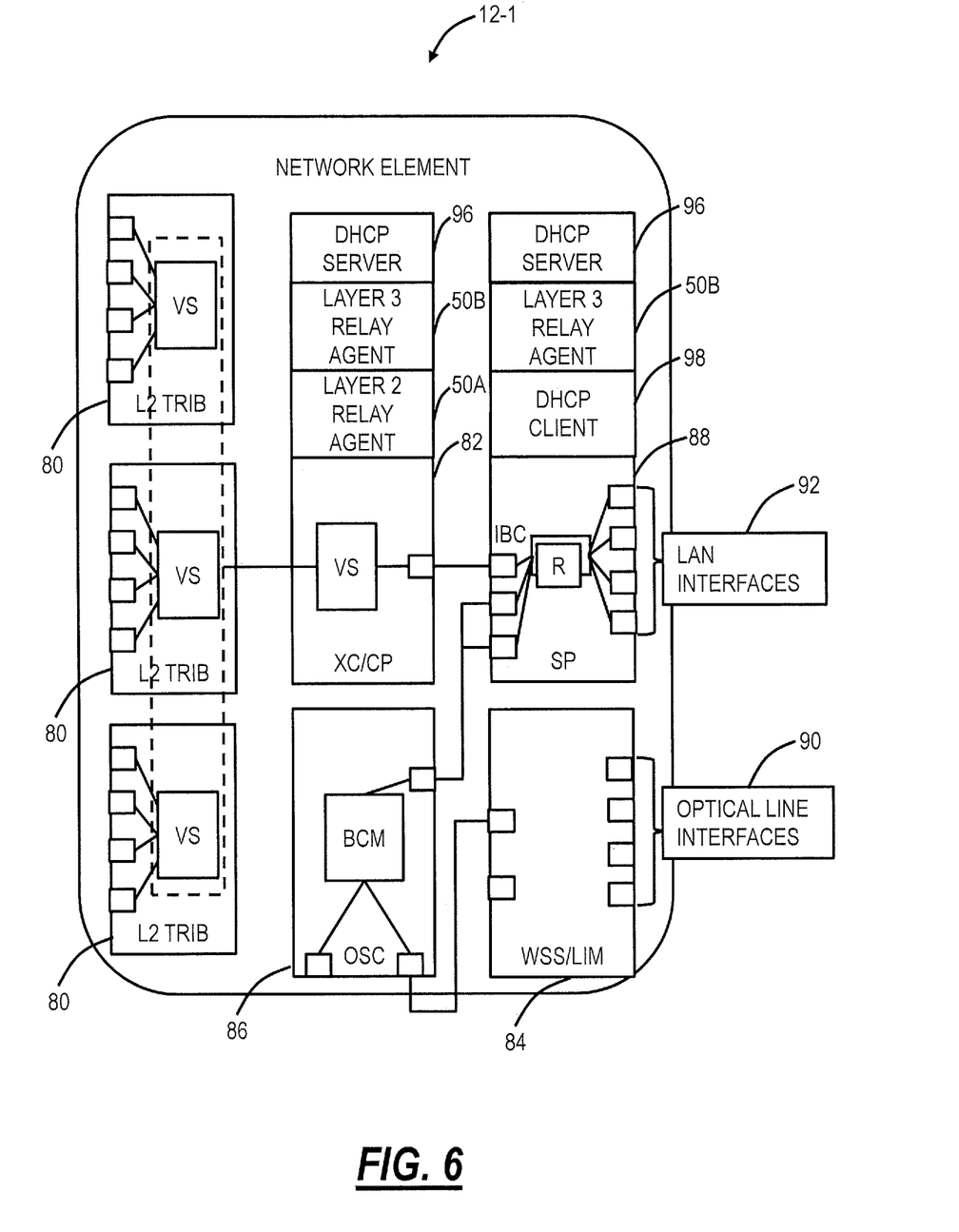
FIG. 6 is a block diagram of an exemplary implementation of the network element.

FIG. 6 is a block diagram of an exemplary implementation of the network element 12-1. In this exemplary embodiment, the network element 12-1 is an optical network element supporting Layer 0 (DWDM), Layer 1 (Time Division Multiplexing (TDM) such as Optical Transport Network (OTN)), and Layer 2 (Packet). Those skilled in the art will recognize the systems and methods contemplate operation with any type of network element with unnumbered interfaces. The network element 12-1 includes Layer-2 packet modules 80, one switch module 82, one or more optical switch/line modules (wavelength switches, amplifiers) 84, optical modules (OSC) 86, and a shelf processor (SP) 88.

The Layer-2 packet interface modules 80 provide Layer-2 packet interfaces, such as Layer 2 tributaries. The Layer-2 packet interface modules 80 can include Virtual Switches (VS) for distributed Layer 2 switching in combination with the switch module 82. The switch modules 82 are configured to switch channels, timeslots, tributary units, packets, etc. between the layer-2 packet interface modules 80. In an exemplary embodiment, the Layer-2 packet interface modules 80 can form ingress and egress virtual switches with the switch modules 82 as center stage switches for a three-stage switch, e.g. a three-stage Clos switch.

The optical switch/line modules 84 can be configured to provide ingress and egress to external connections on the links to/from the network element 12-1. Other configurations and/or architectures are also contemplated. The optical line modules 84 can include optical line interfaces 90 external to the network element 12-1. In an exemplary embodiment, the optical line interfaces 90 can provide connectivity to the DCN 14, such as via overhead, an OSC, etc.

The optical modules 84 can include optical amplifiers (e.g., EDFA) Etc. The shelf processor 88 can provide Operations, Administration, Maintenance, and Provisioning (OAM&P) access; user interface ports; and the like. Of note, the optical line interfaces 90 and/or the LAN interfaces 92 are unnumbered interfaces over which the LTP/ZTP is performed. Note, the LAN interfaces 92 can also include numbered interfaces.

Those of ordinary skill in the art will recognize the network element 12-1 can include other components which are omitted for illustration purposes, and that the systems and methods described herein are contemplated for use with a plurality of different network elements with the network element 12-1 presented as an exemplary type of network element. For example, in another exemplary embodiment, the network element 12-1 may not include the switch modules 82, but rather have the corresponding functionality in the modules 86, 84 (or some equivalent). For the network element 12-1, other architectures providing ingress, egress, and switching are also contemplated for the systems and methods described herein. In general, the systems and methods described herein contemplate use with any network element providing switching of channels, timeslots, tributary units, packets, wavelengths, etc. Furthermore, the network element 12-1 is merely presented as one exemplary network element for the systems and methods described herein.

The network element 12-1 includes a Layer 2 Relay Agent 50A, a Layer 3 Relay Agent 50B, DHCP servers 96, and a DHCP client 98. In an exemplary embodiment, the Relay Agents 50A, 50B can run on both the shelf processor 88 and the switch module 82. Of course, other embodiments are also contemplated. The network element 12-1 can be configured for Layer 2 relay only or for Layer 3 relay only. The Layer 2 Relay Agent 50A can forward DHCP messages to another Layer 2 port or shelf processor 88 for Layer 3 relay, between the DHCP servers 96 and the DHCP client 98. The DHCP can be resolved in the Layer 2 domain or the Layer 3 domain depending on the location of the LTP/ZTP server (the DHCP/FTP servers 42, 44). The switch module 82 can be able to identify the port of incoming traffic.

The FTP server 44 can be referred to as a configuration server which has a provisioning profile (i.e., a configuration file) for the network element 12-1. Note, the FTP server 44 can in some embodiments be combined with the DHCP server 42. The address of the DHCP/FTP servers 42, 44 is known by the network element 12-1, the Layer 2 Relay Agent 50A, and the Layer 3 Relay Agent 50B LTP/ZTP network element commissioning (provisioning) can include two stages—1) communication configuration and 2) additional network element provisioning. For the communication configuration, LTP/ZTP has to bring up the optical line interfaces 90 and/or the LAN interfaces 92 with a DHCP client enabled thereon. The DHCP Relay Agent 50A, 50B pointing to the DHCP server 42 has to be enabled on the neighboring network element 12.

The network element 12-1 negotiates with the DHCP server 42 about the configuration information through option 3 for receiving default route, option 33 for receiving static route, option 60 for identifying vendor type when communicating with DHCP servers, option 61 for identifying a DHCP client and configuration, option 66 for the address of the FTP server 44, and option 67 for the directory on the FTP server 44 that contains the command files. The network element 12-1 can notify a northbound controller once the communication configuration is complete.

In stage 2 for the additional network element provisioning, at this stage, the network element 12-1 is able to reach the FTP server 44. The network element 12-1 then requests the FTP server 44 to send additional configuration commands in order to provision additional services (e.g., optical, other facilities). This could be achieved by downloading a configuration file from the FTP server 44, or this could be achieved by requesting a configuration server to TELNET back to the network element 12-1 and configure it through Transaction Language-1 (TL1) commands, Command Line Interface (CLI), NETCONF, etc.

DHCP Relay Agent Exemplary Operations

Figure 7:
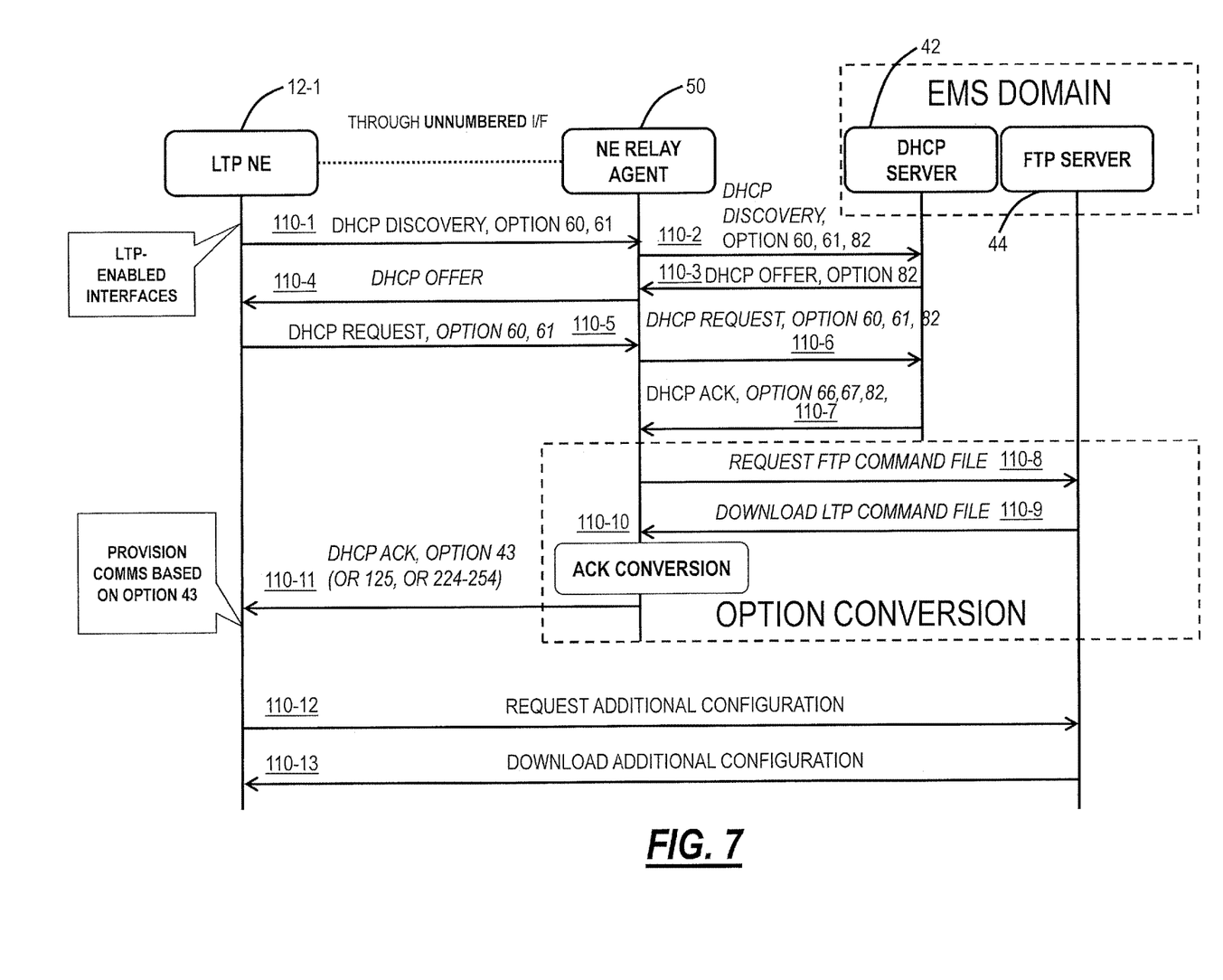
FIG. 7 is a flow diagram of the network element connecting to the DHCP Relay Agent through an unnumbered interface with the DHCP Relay Agent performing option conversion.

FIG. 7 is a flow diagram of the network element 12-1 connecting to the DHCP Relay Agent 50 through an unnumbered interface with the DHCP Relay Agent 50 performing option conversion. In FIG. 7, flow is illustrated between the network element 12-1, the DHCP Relay Agent 50, and an EMS domain including the DHCP server 42, and the FTP server 44. Note, the servers 42, 44 can be combined or separate and other file transfer techniques are contemplated in addition to FTP.

In FIG. 7, the network element 12-1 communicates to the DHCP Relay Agent 50 through an unnumbered interface with is LTP/ZTP enabled. Once powered up, the network element 12-1 sends a DHCP discovery, option 60 and 61 to the DHCP Relay Agent 50 (step 110-1). The DHCP Relay Agent 50 sends the DHCP discovery with option 82 attached to the DHCP server 42 (step 110-2) and the DHCP server 42 sends a DHCP offer to the DHCP Relay Agent 50 (step 110-3) which sends the DHCP offer to the network element 12-1 (step 110-4). The network element 12-1 sends a DHCP request to the DHCP Relay Agent 50 (step 110-5) which sends the DHCP request with options 82 to the DHCP server 42 (step 110-6). The DHCP server 42 sends a DHCP acknowledgment (ACK) with options 66, 67 to the DHCP Relay Agent 50 (step 110-7).

The DHCP Relay Agent 50 in response to the DHCP ACK sends an FTP request for a configuration file to the FTP server 44 (step 110-8). The FTP server 44 sends the LTP/ZTP configuration file to the DHCP Relay Agent 50 (step 110-9). The DHCP Relay Agent 50 performs an ACK conversion (option conversion) (step 110-10) and sends the configuration file to the network element 12-1 over the unnumbered interface using a DHCP ACK with option 43 (or 125, or 224-254) with the configuration file therein (step 110-11). Once the network element 12-1 receives the configuration file, LTP/ZTP provisioning occurs, and the network element 12-1 can now reach the FTP server 44, request additional configuration from the FTP server 44 (step 110-12) and receive the additional configuration (step 110-13). Here, in FIG. 7, the IP address, netmask and default routes assigned by the DHCP server 42 are ignored, and the DHCP server does not configure option 43. FIG. 7 requires the relay agent to verify whether the configuration file exists locally before it requests a FTP to download the file from the server. If the configuration file has been downloaded locally before, the relay agent does not need to download the file from the server, instead, it uses the local copy for option conversion. The local copy is kept for a period of time and then deleted from the local system. It is noted that the time that it takes for the relay agent to download the configuration file may be long enough to cause the DHCP client to time out. In this case, the LTP NE will reinitiate the LTP process.

LTP/ZTP Process by Network Element

Figure 8:
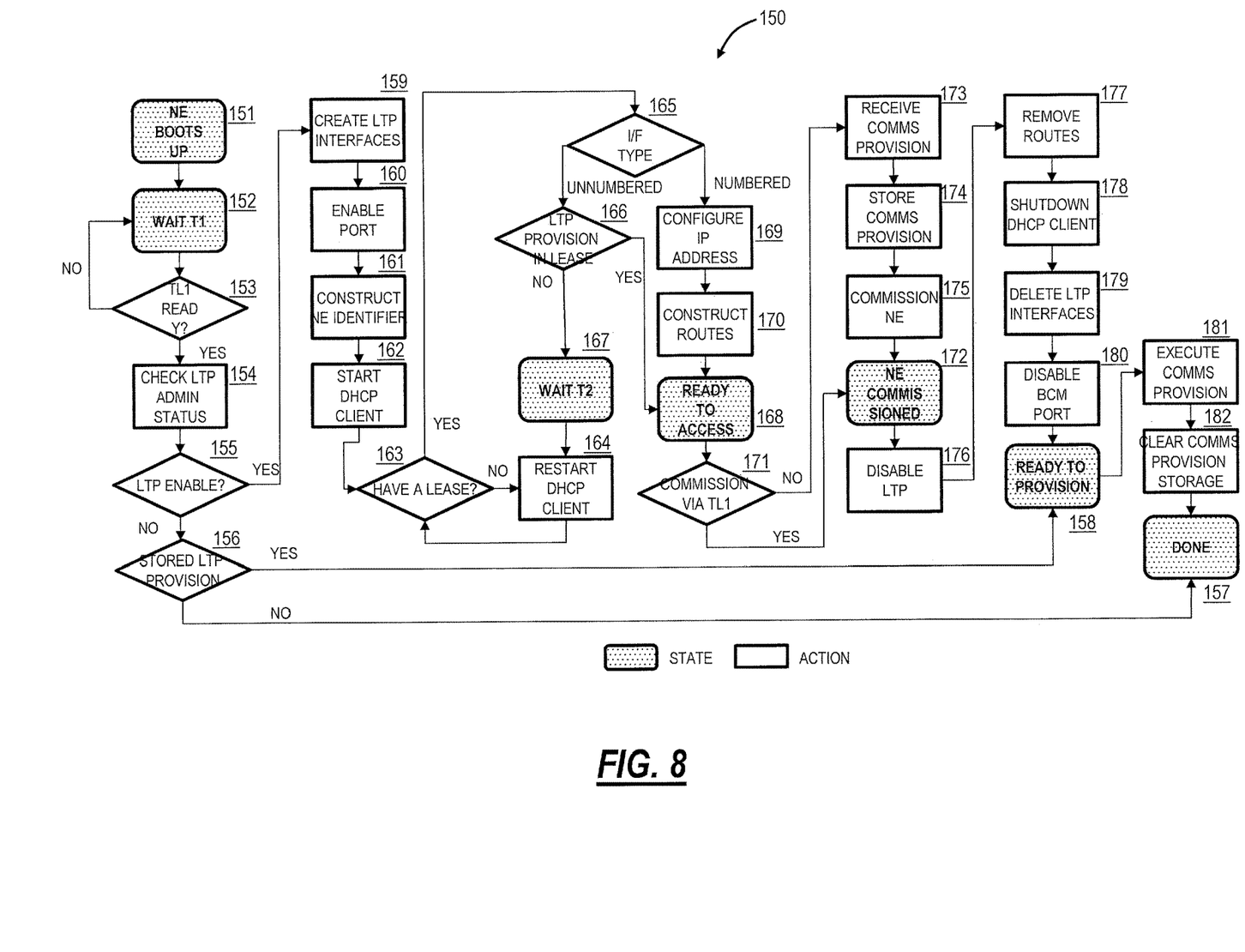
FIG. 8 is a flowchart of an LTP/ZTP process performed by the network element.

FIG. 8 is a flowchart of an LTP/ZTP process 150 performed by the network element 12-1. The network element 12-1 boots up (step 151), waits for a predetermined time (T1) (step 152) until TL1 is ready (step 153). The process 150 includes checking the LTP (or ZTP) administrative status (step 154) to determine if LTP/ZTP is enabled (step 155). If LTP/ZTP is not enabled, the process 150 checks if there is a stored LTP/ZTP provision (step 156), and if not, the process 150 ends (step 157), and if there is a stored LTP/ZTP provision (step 156), the process 150 is ready to provision the network element 12-1 (step 158).

If LTP/ZTP is enabled (step 155), the process 150 includes creating LTP interfaces (step 159), enabling the port (step 160), constructing a network element identifier (step 161), and starting a DHCP client (step 162). The BROADCAST flag must be set for the DHCP packets sent by the DHCP client (step 162). The process 150 includes determining if the DHCP client has a lease (step 163) and, if not, restarting the DHCP client (step 164). Once the DHCP client has a lease (step 163), the process 150 is different based on whether the interface is numbered or unnumbered (step 165). If the interface is unnumbered, the process 150 checks if the LTP provision in the option 43 of the lease (step 166), and, if not, the process 150 includes waiting another predetermined time (T2) and restarting the DHCP client (step 164). If the LTP provision is in the lease, the process 150 is ready to access (step 168).

If the interface is numbered (step 165), the process 150 includes configuring the IP address and netmask (step 169), constructing routes (step 170), and the process 150 is ready to access (step 168). The process 150 checks if the network element 12-1 provisions via TL-1 (step 171), and, if so, the network element is commissioned (step 172). If the network element 12-1 does not provision via TL-1 (step 171), the network element 12-1 receives communications for provisioning (step 173), stores the provisioning information (step 174), and commissions the network element 12-1 (step 175).

After the network element 12-1 is commissioned (step 172), LTP/ZTP is disabled (step 176), routes are removed (step 177), the DHCP client is shutdown (step 178), LTP interfaces including IP addresses are deleted (step 179), the port is disabled (step 180), and the network element 12-1 is ready to provision (step 158). Once ready to provision, the process 150 includes executing provisioning (step 181) in terms of the stored provisioning information (step 174) and clearing the stored provisioning information (step 182).

The LTP/ZTP can be enabled by default when the network element 12-1 comes from manufacturing. After the network element 12-1 boots up, the LTP/ZTP can be disabled if the network element 12-1 is commissioned. The type/category of the network element 12-1 can be carried by DHCP option 60, and a unique client identifier can be carried via option 61. For example, the unique client identifier can be a serial number.

For unnumbered interfaces, the DHCP client can process the lease as follows: the IP address and netmask is not configured on the interface; option 3 is ignored, and no default routes are installed into the routing table; option 33 is ignored, and no static routes are installed into the routing table; if Vendor Specific Information (option 43) presents in the lease, the DHCP client will follow instructions embedded in the option to provision the NE; otherwise, the DHCP client rejects the lease, waits for a while, and starts the DHCP negotiation process again.

DHCP Relay Agent

Figure 9:
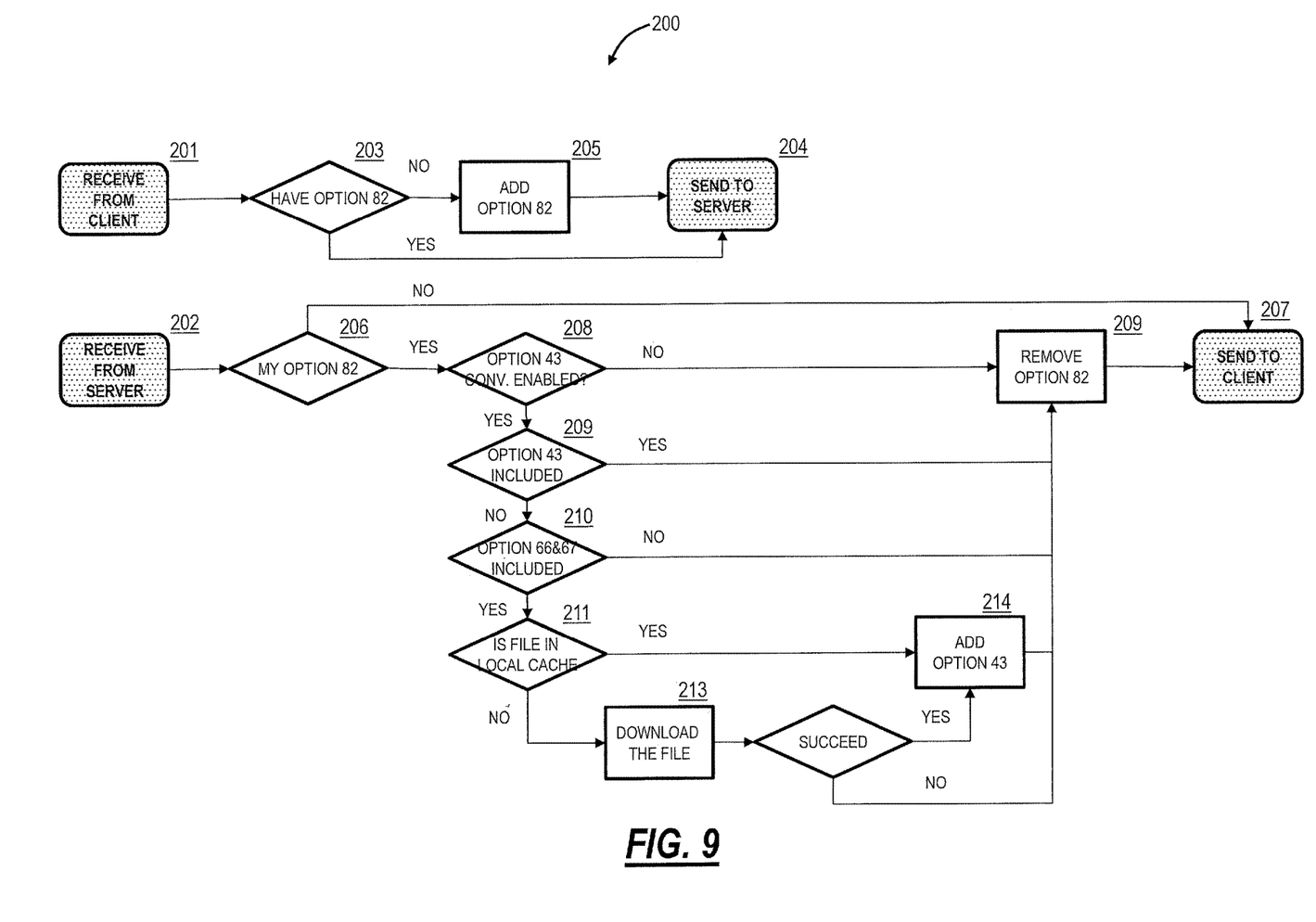
FIG. 9 is a flowchart of a DHCP Relay Agent process.

FIG. 9 is a flowchart of a DHCP Relay Agent process 200. The DHCP Relay Agent 50 can be either of the DHCP Relay Agents 50A, 50B. The DHCP Relay Agent 50 is enabled on an interface connecting to the network element 12-1. Option conversion is automatically enabled if the interface is unnumbered; otherwise, it is disabled. The process 200 operates based on whether the DHCP Relay Agent receives from the DHCP client (step 201) or from the DHCP server 42 (step 202). When data is received from the DHCP client (step 201), the process 200 checks if the data includes option 82 (step 203), and, if so, the process 200 includes sending the data to the DHCP server 42 (step 204), and, if not, the process 200 includes adding option 82 (step 205).

When the data is received from the DHCP server 42 (step 202), the process 200 includes checking if the data is set to option 82 of the DHCP Relay Agent 50 (step 206), and, if not, the process 200 include sending the data to the DHCP client (step 207). If the data is set to option 82 of the DHCP Relay Agent 50 (step 206), the process 200 includes checking if option conversion is enabled (step 208), and, if not, the process 200 includes removing the option 82 (step 209) and sending to the client (step 207). If the option conversion is enabled (step 208), the process 200 includes checking if option 43 is included, and if so, the process 200 includes removing the option 82 (step 209) and sending to the client (step 207). If option 43 is not included (step 209), the process 200 includes checking if options 66, 67 are included (step 210), and, if not, the process 200 includes removing the option 82 (step 209) and sending to the client (step 207). If options 66, 67 are included (step 210), the process 200 includes checking if the configuration file is in a local cache (step 211), and, if so, adds option 43 (step 212) and sends the configuration file. If the configuration file is not a local cache (step 211), the process 200 includes downloading the configuration file (step 213).

The DHCP Relay Agent 50 is configured to download the configuration file on behalf of the network element 12-1, i.e., the DHCP client. The file needs to be stored locally on the network element 12-1 running the DHCP Relay Agent 50. The life cycle of the file needs to be managed. (e.g., the file should be removed after 30 minutes).

Although the diagram shows that option 43 is used for conversion. It is noted that other options can also be employed such as options among 224-254 or option 125.

DHCP Server

The DHCP server 42 is able to provide the following two configuration options: Option 1: Use Client Identifier to identify a configuration; and Option 2: Use Relay Agent Information Option (option 82) to identify a configuration. For Option 1, the DHCP server 42 or northbound application must have knowledge of the identity of the individual network element and associate the client identifier with a particular configuration. A manual intervention (a.k.a. "touch") is required to make above association. The client identifier becomes the "key" to identify the individual configuration. For Option 2, the DHCP Relay Agent 50 provides its own identity (not necessary the Client Identifier) as well as local circuit information to assist the DHCP server 42 or northbound application to determine a configuration for the network element 12-1. The information determines the location of the network element 12-1 and the configuration in terms of the location without manual intervention.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of low or zero touch provisioning of a network element over an unnumbered interface, the method comprising:
    subsequent to booting up, communicating, by the network element in an unconfigured state, to a Dynamic Host Configuration Protocol (DHCP) Relay Agent from the unnumbered interface;
    identifying the network element based on connectivity to the unnumbered interface including identities of the DHCP Relay Agent and port connectivity of the network element with the DHCP Relay Agent;
    subsequent to a work order for the configuration being pushed from a network operations center to one or more network servers, obtaining, at the DHCP Relay Agent, the configuration for the identified network element from the one or more network servers and providing the configuration to the network element through the options of DHCP packets over the unnumbered interface, wherein the network element ignores an Internet Protocol (IP) address in responses from the DHCP Relay Agent; and
    configuring the network element based on the obtained configuration.

2. The method of claim 1, wherein the unnumbered interface is one of Ethernet point-to-point interfaces, Optical Service Channels (OSCs), overhead channels on optical ports, and wherein the unnumbered interface does not have an Internet Protocol (IP) address.

3. The method of claim 1, wherein the DHCP Relay Agent is a Layer 3 DHCP Agent, and wherein the DHCP Relay Agent is executed on the network element for communication to a DHCP server and a file server.

4. The method of claim 1, wherein the obtaining comprises decoding configuration commands from option 43, or option 125 or options among 224-254 of DHCP packets.

5. The method of claim 1, wherein the network element ignores a netmask, default route, and static route in responses from the DHCP Relay Agent.

6. The method of claim 1, wherein the one or more network servers is configured to provide additional configurations to the network element via a permanent address of the network element upon implementation of the configuration.

7. A network element configured for supporting low or zero touch provisioning over an unnumbered interface, the network element comprising:
   a plurality of modules interconnected to one another with each module having circuitry and at least one module having a processor;
   an unnumbered interface communicating to a second unnumbered interface on a second network element; and
   a Dynamic Host Configuration Protocol (DHCP) Relay Agent operating on the at least one module having the processor, wherein the DHCP Relay Agent is configured to
      communicate with a server subsequent to the second network element booting up, in an unconfigured state, and responsive to a request from the second unnumbered interface including communicating port connectivity of the network element to the DHCP Relay Agent, wherein the server identifies the second network element based on connectivity to the unnumbered interface including identities of the DHCP Relay Agent and the port connectivity of the second network element with the DHCP Relay Agent, and
      download a configuration pushed, subsequent to a work order, from a network operations center to the server, based on the identified network element, from the server and provide the configuration to the second unnumbered interface,
   wherein the second network element is commissioned based on the downloaded configuration over the second unnumbered interface, wherein the second network element ignores an Internet Protocol (IP) address in responses from the DHCP Relay Agent.

8. The network element of claim 7, wherein the second unnumbered interface is one of an Ethernet point-to-point interface and an Optical Service Channel (OSC) interface and an overhead channel on optical port, and wherein the second unnumbered interface does not have an Internet Protocol (IP) address.

9. The network element of claim 7, wherein the DHCP Relay Agent is a Layer 3 DHCP Agent.

10. The network element of claim 7, wherein the DHCP Relay Agent operating on the at least one module having the processor is configured to communicate to a DHCP server; and utilize DHCP option 66, 67 information to download the configuration.

11. The network element of claim 7, wherein the DHCP Relay Agent performs an option conversion utilizing option 43, or option 125 or options 224-254 to allow the second network element to obtain the configuration via DHCP packets.

12. The network element of claim 7, wherein the server uniquely identifies the second network element based on one of a client identifier and an identification of the DHCP Relay Agent.

13. A Dynamic Host Configuration Protocol (DHCP) Relay Agent operating with a network element for low or zero touch provisioning over an unnumbered interface, the DHCP Relay Agent comprising:
   one or more processors; and
   memory storing instructions that, when executed, cause the one or more processors to
      communicate with the unnumbered interface subsequent to the network element booting up in an unconfigured state,
      identify the network element based on connectivity to the unnumbered interface including port connectivity to the DHCP Relay Agent,
      communicate the port connectivity of the network element with the DHCP Relay Agent to a server;
      download a configuration, pushed, subsequent to a work order, to the server from a network operations center, for the identified network element from the server, and
      provide the configuration to the network element over the unnumbered interface using DHCP,
   wherein the network element ignores an Internet Protocol (IP) address in responses from the DHCP Relay Agent.

14. The DHCP Relay Agent of claim 13, wherein the unnumbered interface is one of an Ethernet point-to-point interface and an Optical Service Channel (OSC) interface and an overhead channel on optical port, and wherein the unnumbered interface does not have an Internet Protocol (IP) address.

15. The DHCP Relay Agent of claim 13, wherein the DHCP Relay Agent is a Layer 3 DHCP Agent.

16. The DHCP Relay Agent of claim 13, wherein the DHCP Relay Agent utilizes DHCP option 66, 67 information to download the configuration.

17. The DHCP Relay Agent of claim 13, wherein the DHCP Relay Agent performs an option conversion utilizing option 43, or option 125 or options 224-254 to allow the unnumbered interface to obtain the configuration file via DHCP packets.

18. The DHCP Relay Agent of claim 13, wherein the server uniquely identifies the network element based on one of a client identifier pushed with the configuration and an identification of the DHCP Relay Agent.

* * * * *